Figure 1:
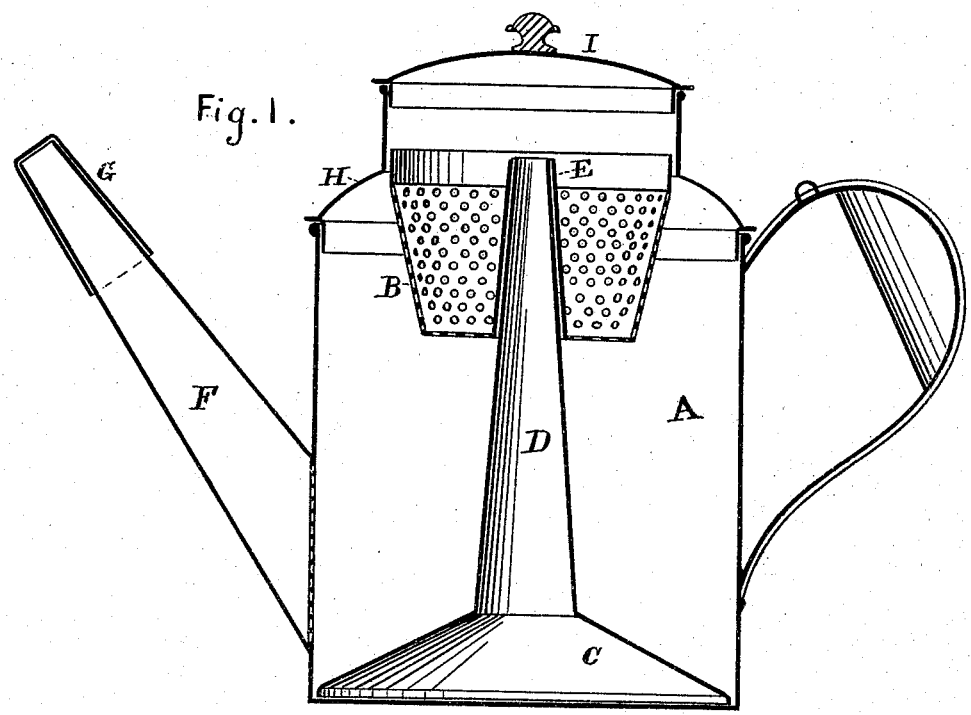

W. E. ROACH.
COFFEE AND TEA POTS.

No. 182,479. Patented Sept. 19, 1876.

Witnesses
Theo. Mungen.
H. A. Daniels.

Inventor:
William E. Roach

UNITED STATES PATENT OFFICE.

WILLIAM E. ROACH, OF PORTSMOUTH, VIRGINIA, ASSIGNOR TO HIMSELF AND SILAS S. LINCOLN, OF WASHINGTON, DISTRICT OF COLUMBIA.

IMPROVEMENT IN COFFEE AND TEA POTS.

Specification forming part of Letters Patent No. 182,479, dated September 19, 1876; application filed May 31, 1876.

*To all whom it may concern:*

Be it known that I, WILLIAM E. ROACH, of Portsmouth, in the county of Norfolk and State of Virginia, have invented certain new and useful Improvements in Coffee and Tea Pots, and like articles; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of my invention is to construct a coffee-pot so that all the aroma of the coffee will be retained in the vessel during the process of boiling; and my invention consists in the arrangement of devices as hereinafter described.

Figure 2:
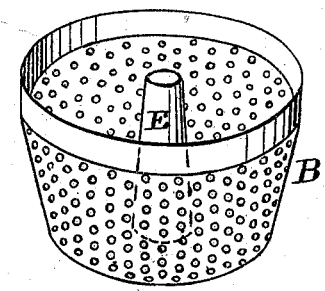
Figure 3:
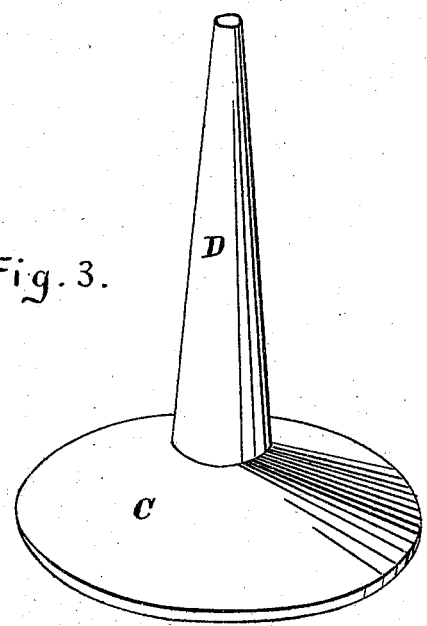

In order that my invention may be clearly understood, reference is made to the drawing as follows:

Figure 1 is a vertical sectional view of my improved coffee-pot. Fig. 2 is a perspective view of the coffee-holder. Fig. 3 is a perspective view of the fountain-tube.

A represents the body of the coffee-pot; B, the perforated coffee-holder; C, the detachable disk, and D the fountain-tube. The coffee-holder B is made flaring on its outside, and is provided with a central flaring tube, E, that slides over the fountain-tube D, by means of which it is held suspended in the coffee-pot. The holder B can be made of perforated metal, reticulated wire, or other suitable material. The cover H fits closely in the top of the vessel, and is taken off when it is desired to put in water. Said cover has an opening in its top provided with a cover, I. Through the opening in the top the coffee can be put into the holder, and water can also be poured therein over the coffee. The spout F connects with the body below the holder, and is furnished at its outer end with a tightly-fitting cap, G. The disk C is made flaring, and at its lower edge reaches across the bottom of the coffee-pot, and with its tube D can be taken out of the vessel.

The operation of my coffee-pot is as follows: The coffee is put into the holder B, and the water into the vessel A. When the water boils a current of hot water and steam will pass under the disk C, and ascend the tube D and pour over the coffee, and then pass through the openings into the vessel A, and so long as the boiling continues the liquid will ascend the fountain-tube and pour out over the material in the holder.

My device can be used also for steeping any kind of tea, or making decoctions from herbs, barks, or roots of any kind.

The detachable disk C extends nearly to the outside of the bottom, thus concentrating all the heat generated on the inside of the disk, and the disk thus extending as close as possible to the outside, and extending on an incline upward toward the center, the heat naturally passes upward on an incline through the pipe or tube D to the holder B, which would not be the case where the disk C extended upward at right angles, or where the disk did not cover the entire bottom, in which event the heat would be as likely to flow up into the body of the pot.

I am aware of Patents Nos. 99,068, 126,555, and 133,582, and therefore lay no claim to anything shown therein; but

Having thus described my invention, what I desire to claim is—

The detachable metal perforated coffee-holder, having the central tapering tube, in combination with the disk C, covering nearly the entire bottom of the vessel, and provided with the tapering tube D, detachable top H, and cover I, all constructed and arranged as and for the purpose specified.

In testimony that I claim the foregoing as my own I affix my signature in presence of two witnesses.

WILLIAM E. ROACH.

Witnesses:
   S. S. LINCOLN,
   JOHN H. DICKERSON.